US012592026B2

(12) United States Patent
Ravi et al.

(10) Patent No.:  US 12,592,026 B2
(45) Date of Patent:  Mar. 31, 2026

(54) NEURAL RADIANCE FIELD FOR VEHICLE

(71) Applicants: Ford Global Technologies, LLC, Dearborn, MI (US); THE REGENTS OF THE UNIVERSITY OF MICHIGAN, INNOVATION PARTNERSHIPS, Ann Arbor, MI (US)

(72) Inventors: Radhika Ravi, San Diego, CA (US); Manikandasriram Srinivasan Ramanagopal, Pittsburgh, PA (US); Ramanarayan Vasudevan, Ann Arbor, MI (US); Katherine Skinner, Ann Arbor, MI (US)

(73) Assignees: Ford Global Technologies, LLC, Dearborn, MI (US); The Regents of the University of Michigan, Ann Arbor, MI (US)

( * ) Notice: Subject to any disclaimer, the term of this patent is extended or adjusted under 35 U.S.C. 154(b) by 161 days.

(21) Appl. No.: 18/528,835

(22) Filed: Dec. 5, 2023

(65) Prior Publication Data

US 2025/0182386 A1      Jun. 5, 2025

(51) Int. Cl.
| | |
|---|---|
| *G06T 15/50* | (2011.01) |
| *G06T 17/00* | (2006.01) |
| *H04N 25/47* | (2023.01) |

(52) U.S. Cl.
CPC ............ G06T 15/506 (2013.01); G06T 17/00 (2013.01); H04N 25/47 (2023.01)

(58) Field of Classification Search
CPC ... G06T 15/506; G06T 17/00; G06T 2210/61; H04N 25/47
See application file for complete search history.

(56) References Cited

U.S. PATENT DOCUMENTS

| | | | |
|---|---|---|---|
| 11,610,360 | B2 | 3/2023 | Muller et al. |
| 2022/0239844 | A1 | 7/2022 | Lv et al. |
| 2024/0331188 | A1* | 10/2024 | Chen ........................ G06T 7/70 |

(Continued)

FOREIGN PATENT DOCUMENTS

| | | |
|---|---|---|
| WO | 2022104299 A1 | 5/2022 |

OTHER PUBLICATIONS

Q. Ma, D. P. Paudel, A. Chhatkuli and L. Van Gool, "Deformable Neural Radiance Fields using RGB and Event Cameras," Â 2023 IEEE/CVF International Conference on Computer Vision (ICCV), Paris, France, 2023, pp. 3567-3577, doi: 10.1109/ICCV51070.2023. 00332. (Year: 2023).*

(Continued)

*Primary Examiner* — Said Broome
*Assistant Examiner* — Jordan Wan Yick
(74) *Attorney, Agent, or Firm* — Frank A. MacKenzie; Brooks Kushman P.C.

(57)          ABSTRACT

A computer includes a processor and a memory, and the memory stores instructions executable by the processor to train a NeRF network to model a dynamic scene and, during the training, supervise the NeRF network with data from an event camera. The NeRF network is a neural radiance field modeling a geometry of the scene and a light intensity of the scene. The NeRF network includes a baseline network modeling the scene at an initial time and a deformation network modeling change to the scene since the initial time.

18 Claims, 4 Drawing Sheets

(56)            References Cited

U.S. PATENT DOCUMENTS

2024/0365014  A1 *  10/2024  Lore ...................... H04N 23/84
2024/0371081  A1 *  11/2024  Matthews ............... G06T 15/20
2024/0420341  A1 *  12/2024  Li ............................ G06T 7/90

OTHER PUBLICATIONS

S. Klenk, L. Koestler, D. Scaramuzza and D. Cremers, "E-NeRF: Neural Radiance Fields From a Moving Event Camera," in Â IEEE Robotics and Automation Letters, vol. 8, No. 3, pp. 1587-1594, Mar. 2023, doi: 10.1109/LRA.2023.3240646 (Year: 2023).*
K. Fukuda, T. Kurita and H. Aizawa, "Neural Radiance Fields with Regularizer Based on Differences of Neighboring Pixels," Â 2023 International Joint Conference on Neural Networks (IJCNN), Gold Coast, Australia, 2023, pp. 1-7, doi: 10.1109/IJCNN54540.2023.10191946. (Year: 2023).*
Ev-NeRF: Event Based Neural Radiance Field, Inwoo Hwang, Junho Kim, and Young Min Kim, 2023, 2206.12455, arXiv, cs.CV, https://arxiv.org/abs/2206.12455. (Year: 2023).*
Pumarola et al., "D-NeRF: Neural Radiance Fields for Dynamic Scenes", arXiv:2011.13961v1 [cs.CV] Nov. 27, 2020.
Yan et al., "NeRF-DS: Neural Radiance Fields for Dynamic Specular Objects", arXiv:2303.14435v1 [cs. CV] Mar. 25, 2023.

* cited by examiner

NEURAL RADIANCE FIELD FOR VEHICLE

BACKGROUND

Modern vehicles typically include a variety of sensors. Some sensors detect the external world, e.g., objects and/or characteristics of surroundings of the vehicles, such as other vehicles, road lane markings, traffic lights and/or signs, road users, etc. Types of sensors for vehicles include radar sensors, ultrasonic sensors, scanning laser range finders, light detection and ranging (lidar) devices, and image processing sensors such as cameras.

DETAILED DESCRIPTION

Figure 1:
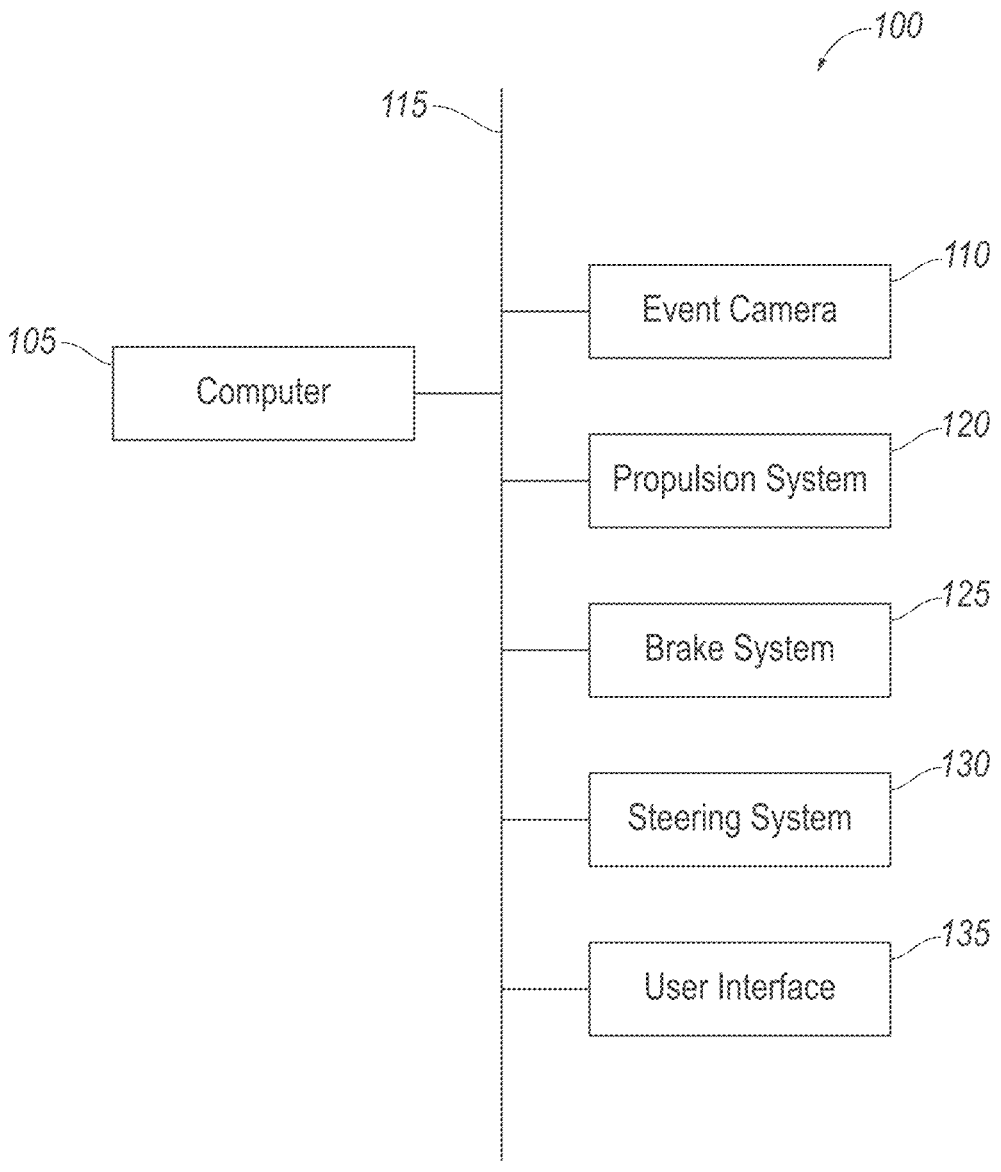
FIG. 1 is a block diagram of an example vehicle.

This disclosure describes techniques to model a dynamic scene geometrically and visually for operating a vehicle through the scene. The scene is modeled using a neural radiance field (NeRF). A neural radiance field is a neural network trained to implicitly represent a specific scene. In this disclosure, the NeRF network models both the geometry and the light intensity of the scene. The NeRF network can be used to reconstruct the scene from a different point of view than the sensor(s) used to train the NeRF network. The NeRF network includes a baseline network modeling the scene at an initial time and a deformation network modeling change to the scene since the initial time. The baseline network is useful for initially learning a specific scene, e.g., the environment surrounding a vehicle, and the deformation network is useful for tracking changes to the scene, e.g., as objects in the environment move or as the vehicle moves through the environment. A computer (e.g., on board the vehicle) is programmed to train the NeRF network to model a dynamic scene and, during the training, supervise the NeRF network with data from an event camera mounted to the vehicle. An event camera can record an asynchronous log of intensity changes at different pixels, instead of data from each pixel at each timestep as done by a traditional frame-based camera. The event camera can thus generate image data without motion blur and without certain lighting issues. Accordingly, the use of data from an event camera for supervising the NeRF network may provide a more accurate reconstruction of the scene by the NeRF network than, e.g., the use of a frame-based camera. The computer may operate the vehicle based on the NeRF network, e.g., based on one or more reconstructions generated by the NeRF network. For example, the computer may use reconstructions from the perspective of future points on a planned path for the vehicle to determine how to actuate the propulsion system, brake system, and/or steering system of the vehicle at the future points.

A computer includes a processor and a memory, and the memory stores instructions executable by the processor to train a NeRF network to model a dynamic scene and, during the training, supervise the NeRF network with data from an event camera. The NeRF network is a neural radiance field modeling a geometry of the scene and a light intensity of the scene. The NeRF network includes a baseline network modeling the scene at an initial time and a deformation network modeling change to the scene since the initial time.

In an example, the instructions may further include instructions to, after the training, actuate a component of a vehicle based on the NeRF network, the vehicle including the computer and the event camera.

In an example, the data from the event camera may include a plurality of events, each event being a change in the light intensity, each event including a pixel location and a time of the change in the light intensity. In a further example, each event may indicate that the change in the light intensity at the respective pixel location and the respective time is greater than a contrast threshold.

In another further example, each event may include a polarity indicating a direction of the respective change in the light intensity.

In an example, the instructions may further include instructions to update the NeRF network based on a loss function. In a further example, the data from the event camera may include a plurality of events, each event being a change in the light intensity, and the loss function may include an event loss based on the events at a pixel location. In a yet further example, the event loss may include a difference between a predicted change in the light intensity at the pixel location according to the NeRF network and a summation of the events at the pixel location.

In another further example, the data from the event camera may include a plurality of events, each event being a change in the light intensity, and the loss function may include a nonevent loss based on a period between consecutive events at a pixel location. In a yet further example, the nonevent loss may include a difference between a predicted change in the light intensity at the pixel location over the period according to the NeRF network and a preset value.

In another yet further example, the nonevent loss for the pixel location may depend on whether an event occurred over the period at a neighboring pixel location of the pixel location. In a still yet further example, in response to the event occurring over the period at the neighboring pixel location, the nonevent loss may include a difference between a predicted change in the light intensity at the pixel location over the period according to the NeRF network and a contrast threshold.

In another still yet further example, in response to a lack of an event occurring over the period at the neighboring pixel location, the nonevent loss may enforce a predicted change in the light intensity at the pixel location over the period according to the NeRF network to be zero.

In an example, the baseline network may receive a position and a direction as inputs, and the baseline network may output a light intensity and a volume density, the light intensity and the volume density as seen in the direction from the position.

In an example, the deformation network may receive a current position and a current time as inputs, and the deformation network may output a spatial change from the initial time to the current time of a point that is at the current position at the current time. In a further example, the baseline network may receive the current position adjusted by the spatial change as an input.

In an example, the baseline network and the deformation network may be multilayer perceptrons.

A method includes training a NeRF network to model a dynamic scene and, during the training, supervising the NeRF network with data from an event camera. The NeRF network is a neural radiance field modeling a geometry of the scene and a light intensity of the scene. The NeRF network includes a baseline network modeling the scene at an initial time and a deformation network modeling change to the scene since the initial time.

In an example, the method may further include, after the training, actuating a component of a vehicle based on the NeRF network, the vehicle including the event camera.

In an example, the deformation network may receive a current position and a current time as inputs, the deformation network may output a spatial change from the initial time to the current time of a point that is at the current position at the current time, and the baseline network may receive the current position adjusted by the spatial change as an input.

With reference to the Figures, wherein like numerals indicate like parts throughout the several views, a computer 105 includes a processor and a memory, and the memory stores instructions executable by the processor to train a NeRF network 300 to model a dynamic scene and, during the training, supervise the NeRF network 300 with data 200 from an event camera 110. The NeRF network 300 is a neural radiance field modeling a geometry of the scene and a light intensity of the scene. The NeRF network 300 includes a baseline network 305 modeling the scene at an initial time and a deformation network 310 modeling change to the scene since the initial time.

With reference to FIG. 1, the computer 105 and the event camera 110 may be part of a vehicle 100. The vehicle 100 may be any passenger or commercial automobile such as a car, a truck, a sport utility vehicle, a crossover, a van, a minivan, a taxi, a bus, etc. The vehicle 100 may include the computer 105, the event camera 110, a communications network 115, a propulsion system 120, a brake system 125, a steering system 130, and a user interface 135.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 115. The communications network 115 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the event camera 110, the propulsion system 120, the brake system 125, the steering system 130, the user interface 135, and other components via the communications network 115.

The event camera 110 is an imaging sensor that responds to local changes in intensity, also sometimes referred to as a neuromorphic camera or dynamic vision sensor. Each pixel in the event camera 110 independently responds to changes in intensity as the changes occur, and each pixel does not return data in the absence of a change in intensity. Each pixel stores a reference intensity value and compares the reference intensity value to a current intensity value. In response to the difference in intensity exceeding a threshold, the pixel resets the reference intensity value to the current intensity value and outputs data indicating the change in intensity along with a timestamp of when the change occurred. The data 200 generated by the event camera 110 is discussed below with respect to FIG. 2. The event camera 110 may be any suitable type, e.g., a temporal contrast sensor such as a dynamic vision sensor (DVS) or sensitive DVS (sDVS), a temporal image sensor, a dynamic and active-pixel vision sensor (DAVIS), a retinomorphic sensor, etc.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The user interface 135 presents information to and receives information from an operator of the vehicle 100. The user interface 135 may be located, e.g., on an instrument panel in a passenger compartment of the vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

Figure 2:
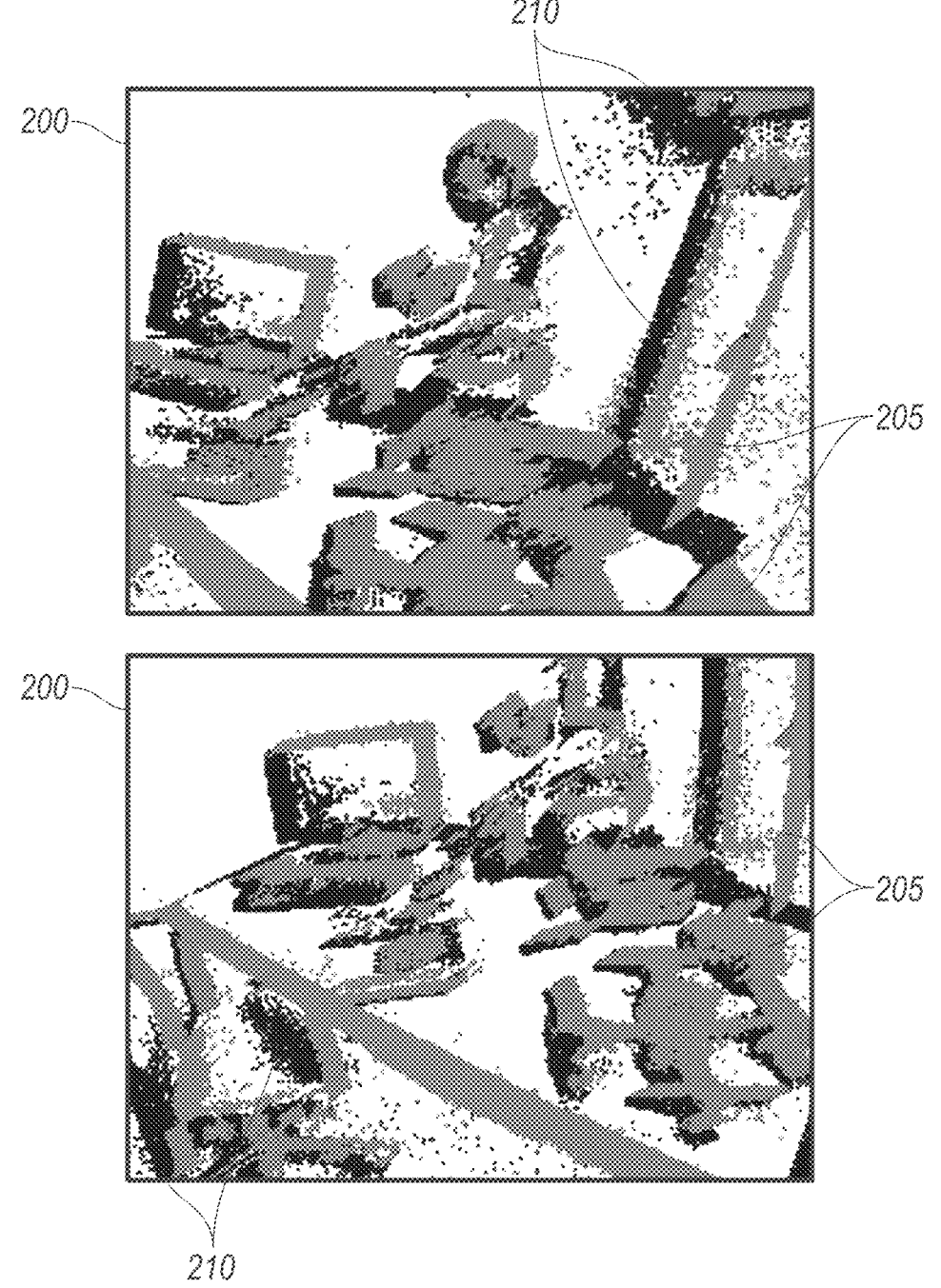
FIG. 2 is a depiction of example data from an event camera of the vehicle over two time periods.

With reference to FIG. 2, the data 200 from the event camera 110 includes a plurality of events. Each event is a change in light intensity. Each event includes a pixel location, a time of the change in the light intensity, and possibly a polarity indicating a direction of the respective change in the light intensity, e.g., $e_i=(u_i, t_i, p_i)$, in which e is the event, i is an index of the time, u is a two-dimensional pixel location, t is a timestamp, and p is the polarity. The polarity p may be a binary variable, e.g., may take a value of either $-1$ for a decrease in light intensity or $+1$ for an increase in light intensity. FIG. 2 shows events collected over a period of time, in which the gray dots 205 are events during which the light intensity increased (i.e., p=1) and black dots 210 are events during which the light intensity decreased (i.e., p=−1). (For clarity, only a few of the dots 205, 210 are labeled in FIG. 2.) The light intensity may be monochrome, i.e., not broken down into specific colors, and the light intensity may therefore be a scalar value. Each event indicates that the change in the light intensity at the respective pixel location and the respective time is greater than a contrast threshold; in other words, each event may be generated in response to the change in the light intensity at the respective pixel location and the respective time being greater than the contrast threshold. The change in light intensity may be represented as a difference in logarithmic intensity, e.g., as in the following expression:

$$|\log(I(u, t_i)) - \log(I(u, t_{i-1}))| \geq C$$

in which I is the light intensity at a particular pixel and time and C is the contrast threshold. The contrast threshold C may be a preprogrammed or a physical property of the event camera 110.

Figure 3:
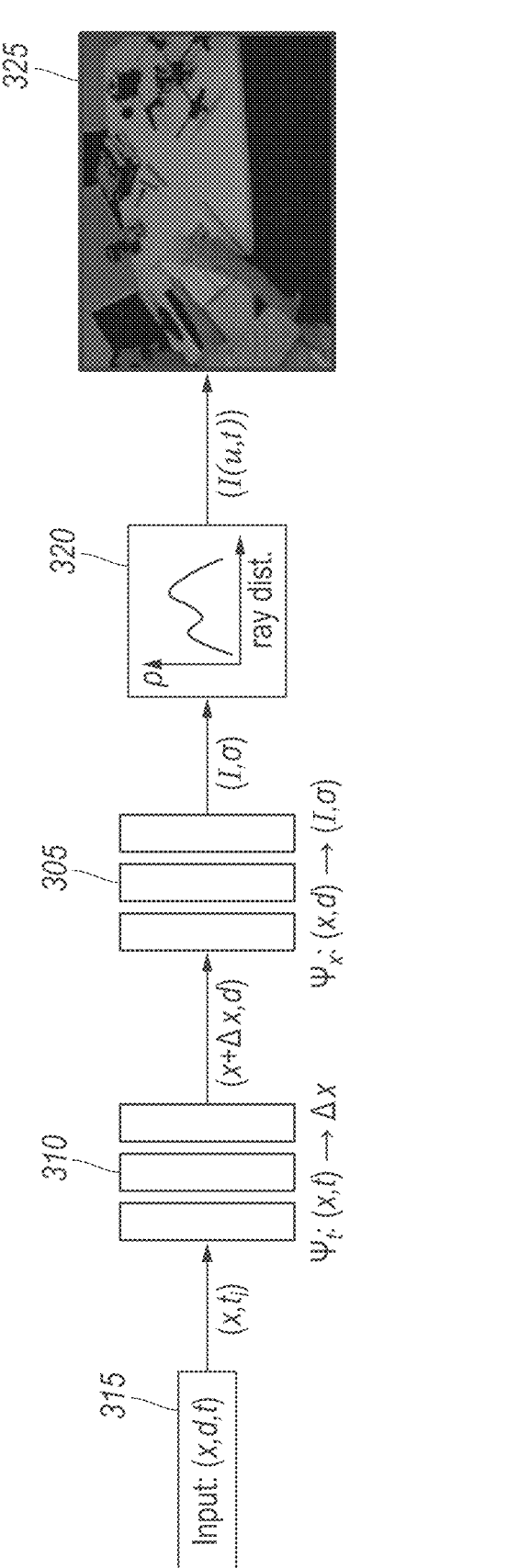
FIG. 3 is a diagram of an example neural radiance field (NeRF) network that receives the data from the event camera.

With reference to FIG. 3, in general, a neural radiance field (NeRF) is a neural network trained to implicitly represent a specific scene. Once a NeRF is trained on a scene, the NeRF can be used to generate new views of the scene from perspectives that were not included in the training data. Conventionally, the training data is solely a plurality of image frames of a scene from a frame-based camera, and a trained NeRF takes a three-dimensional position x=(x, y, z) and a viewing direction $d=(x_d, y_d)$ as inputs and outputs a scalar volume density σ at that position and the color c=(r, g, b) emitted at that position toward the viewing direction. A NeRF is trained for a specific scene. For a conventional NeRF, if a different scene is of interest or if the scene changes, then a new NeRF will need to be trained.

The NeRF network 300 is a neural radiance field modeling geometry of the scene and light intensity of the scene. Once trained, the NeRF network 300 receives a three-dimensional position, a viewing direction, and a time as inputs 315 and generates a light intensity and a volume density as outputs, i.e., $\Psi$: (x, d, t)→(I, σ), in which $\Psi$ is the NeRF network 300, x is the three-dimensional location, d is the viewing direction, t is the time, I is the light intensity, and σ is the scalar volume density. The volume density and the light intensity are as seen in the viewing direction from the position at the time. In other words, the volume density is the predicted volume density at the position and time, and the light intensity is the light intensity emitted at that position toward the viewing direction at the time. The volume density and the light intensity may be scalars. The viewing direction d may be a two-dimensional vector, e.g., orthogonal horizontal dimensions. The NeRF network 300 includes the baseline network 305 and the deformation network 310.

The baseline network 305 models the scene of interest at an initial time $t_0$. Once trained, the baseline network 305 receives a three-dimensional position and a viewing direction as inputs and generates the volume density at that position and the light intensity emitted at that position toward the viewing direction as outputs, i.e., $\Psi_x$: (x, d)→(I, σ), in which $\Psi_x$ is the baseline network 305. The volume density and the light intensity are as seen in the viewing direction from the position at the initial time. In other words, the volume density is the predicted volume density at the position and the initial time, and the light intensity is the light intensity emitted at that position toward the viewing direction at the initial time. The volume density and the light intensity may be scalars.

The deformation network 310 models change to the scene since the initial time. Once trained, the deformation network 310 receives a current position and a current time as inputs, and the deformation network 310 outputs a spatial change from the initial time to the current time of a point that is at the current position at the current time, i.e., $\Psi$: (x, t)→Δx, in which $\Psi_t$ is the deformation network 310 and Δx is the spatial change. In other words, the spatial change Δx reverts the point at position x at time t back to its position at the initial time $t_0$. The spatial change Δx has the same dimensionality as the position, e.g., three dimensions.

The baseline network 305 and the deformation network 310 may be multilayer perceptrons (MLPs). An MLP is a fully connected feedforward artificial neural network. Each MLP includes an input layer, at least one hidden layer, and an output layer. The layers are made of nodes. The nodes in each layer receive as inputs the outputs from the nodes in the previous layer, starting with the input layer and ending with the output layer. Each connection between nodes in adjacent layers has a weight. Each node has an activation function that takes as its argument the weighted inputs to that node. MLPs are fully connected in that each node in one layer is connected to each node in the adjacent layer(s). Training an MLP results in changing the weights via backpropagation.

The NeRF network 300 includes the deformation network 310 and the baseline network 305 arranged in series with the baseline network 305 following the deformation network 310. The deformation network 310 receives a current position x and a current time t and outputs the spatial change Δx to the current position x from the initial time $t_0$ to the current time t. The baseline network 305 receives the current position adjusted by the spatial change, i.e., x'=x+Δx, and the viewing direction d as inputs, and the baseline network 305 outputs the volume density and the light intensity as seen in the viewing direction from the position at the time. The baseline network 305 and the deformation network 310 are distinct networks. Thus, the baseline network 305 and the deformation network 310 do not have any interacting terms, i.e., there are no connections from nodes in one of the baseline network 305 and the deformation network 310 to nodes in the other of the baseline network 305 and the deformation network 310, other than the final output of the deformation network 310 being used in the input to the baseline network 305.

The computer 105 is programmed to render a ray 320 extending from the event camera 110 by executing the NeRF network 300 at sample points along the ray 320. The positions of the sample points and corresponding time may be inputted to the NeRF network 300, along with the direction of the ray 320. The computer 105 then outputs an expected light intensity Î of the ray 320, which is the expected light intensity of a corresponding pixel (u, v) of an image that would be returned by a frame-based camera located at the origin of the ray 320. For example, the computer 105 may determine an expected light intensity of the ray 320 by summing or integrating intensity terms for the sample points, the terms weighted based on the volume density and distance between the sample points, e.g., based on an exponential of a product of the scalar volume density and the distance between consecutive sample points, e.g., a quadrature approximation of a volumetric rendering equation, as in the following expression:

$$\hat{I} = \sum_{k=1}^{N} \exp\left(-\sum_{m=1}^{k-1} \sigma(x'(b_m, t))\delta_m\right)(1 - \exp(-\sigma(x'(b_k, t))\delta_k))I(x'(b_k, t), d)$$

in which $\hat{I}$ is the expected light intensity of the ray 320, k and m are indexes of the sample points, N is the total number of sample points on the ray 320, exp( ) is the exponential function, i.e., Euler's number e raised to the power of its argument, $\sigma(\ )$ is the volume density at the position of its argument, $b_m$ is the distance from the origin of the ray 320 to the sample point m, $\delta_m$ is the distance between sample points m and m+1, x'($b_m$, t) is the position of the sample point m adjusted by the spatial change for time t, and I( ) is the light intensity for the position and direction of its argument. The distances between the sample points can be represented as the difference between the distances from the origin to one sample point and to the next sample point, i.e., $\delta_m = b_{m+1} - b_m$. The adjusted position x' is determined by executing the deformation network 310. The volume density $\sigma(\ )$ and the light intensity I( ) are determined by executing the baseline network 305 on arguments derived from executing the deformation network 310.

The computer 105 may be programmed to generate a synthetic image 325 from a different perspective and a different time than the event camera 110 by executing the NeRF network 300. For example, the computer 105 may receive an input three-dimensional position, an input viewing direction, and an input time; generate a plurality of viewing directions extending in vertical and horizontal ranges around the input viewing direction; and calculate a plurality of expected light intensities from the input position and respective viewing directions at the input time in the manner described above. Each expected light intensity is one pixel in the synthetic image 325.

The computer 105 is programmed to train the NeRF network 300 to model a dynamic scene. During the training, the computer 105 supervises the NeRF network 300 with data 200 from the event camera 110. In other words, the computer 105 trains the NeRF network 300 to model the dynamic scene, the dynamic scene being represented by the data 200 from the event camera 110. As a general overview, the computer 105 calculates a loss function comparing values derived from the NeRF network 300 in training with ground-truth data 200 from the event camera 110. The computer 105 uses the loss function to supervise the NeRF network 300 with the data 200 from the event camera 110. The loss function may include an event loss and a nonevent loss, as will be described in detail below. The computer 105 updates the NeRF network 300 based on the loss function. For example, the weights of the MLPs serving as the deformation network 310 and the baseline network 305 may be adjusted using backpropagation to minimize the value of the loss function, as is known.

For determining the event loss, the computer 105 may be programmed to sample a plurality of pairs of events from the data 200, which will be referred to as event pairs. For the purposes of this disclosure, an event pair is defined as two events, not necessarily consecutive, occurring at the same pixel location at different times. This sample is designed to capture changes in light intensity in order to train the NeRF network 300 to reflect those changes. Using nonconsecutive event pairs in the event loss can help prevent error accumulation over time. The sampled event pairs may cover a large number of pixel locations and times.

The event loss is based on the events at a pixel location, and then aggregated across many pixel locations. Specifically, for each event pair in the sample, the event loss includes a difference between a predicted change in the light intensity at the corresponding pixel location according to the NeRF network 300 and a summation of the events at that pixel location. The predicted change in the light intensity can be from the earlier event in the event pair to the later event in the event pair. The predicted change in the light intensity may be a difference in logarithms of the predicted intensities at the time of the earlier event and of the later event. The summation can be a summation of the intervening events between the earlier event and the later event of the event pair, e.g., a summation of a product of the polarity of each event and the contrast threshold. For example, the event loss can be the mean squared error of the difference between the predicted change in the light intensity at a pixel location and the summation of the events at the pixel location across the sample event pairs, as in the following expression:

$$\mathcal{L}_{event} = \sum \left\| \left(\log(\hat{I}(u, t_i)) - \log(\hat{I}(u, t_j))\right) - \sum_{\forall e(u,t,p):t_i < t < t_j} pC \right\|_2^2$$

in which i is the index for the earlier event in the event pair, j is the index for the later event in the event pair, and u is the pixel location of the event pair i, j.

For determining the nonevent loss, the computer 105 may be programmed to sample a plurality of periods between consecutive events at respective pixel locations, i.e., each period is between two consecutive events at the same pixel location. The computer 105 may sample events in the data 200 and corresponding times between the respective events and the respective next consecutive events at the respective pixel locations. Each sampled event $e_i$ has a period running from an earlier sample time to a later sample time. The earlier sample time $t_i$ is the time of the event $e_i$, and the later sample time $t_{i'}$ is a random time greater than the time t; and less than a time $t_{i+1}$ of the next consecutive event $e_{i+1}$ at the same pixel location, i.e., $t_i < t_{i'} < t_{i+1}$. This sample is designed to capture intervals at pixel locations when a change in light intensity did not occur in order to train the NeRF network 300 to not include changes when changes did not occur.

The nonevent loss is based on the periods between consecutive events at specific pixel locations. Specifically, the nonevent loss includes a difference between a predicted change in the light intensity at the pixel location over the period according to the NeRF network 300 and a preset value. The nonevent loss for the pixel location, e.g., the preset value, may depend on whether an event occurred over the period at a neighboring pixel location of the pixel location. For the purposes of this disclosure, a "neighboring pixel location" is defined as a pixel location within a preset range of the pixel location of interest, e.g., for a pixel of interest (u, v), the neighboring pixels may be within (u±1, v±1). For example, for a sample event $e_i$, in response to an event occurring at a neighboring pixel during the period t; to $t_{i'}$, the preset value may be the contrast threshold C, and in response to a lack of an event occurring at a neighboring pixel during the period $t_i$ to $t_{i'}$, the preset value may be zero. In other words, for a sample event $e_i$, in response to an event occurring at a neighboring pixel during the period $t_i$ to $t_{i'}$, the nonevent loss may enforce the predicted change in the light intensity to be less than the contrast threshold C, and in response to a lack of an event occurring at a neighboring pixel during the period $t_i$ to $t_{i'}$, the nonevent loss may enforce the predicted change in the light intensity to be zero. The form of the expression of the nonevent loss may also change depending on whether an event occurred at a neighboring pixel location during the period, e.g., a rectified linear unit (ReLU) activation function for a neighboring event and mean squared error for a lack of a neighboring event, e.g., as in the following expression:

$$\mathcal{L}_{non} = \begin{cases} \sum relu\left(\left|\log\left(\hat{I}(u, t_i)\right) - \log\left(\hat{I}(u, t_{i'})\right)\right| - C\right), \\ \quad \text{if } \exists\, e(u', t, p) : t_i < t < t_{i+1}, u' \in \text{neighbor}(u) \\ \sum \left\|\log\left(\hat{I}(u, t_i)\right) - \log\left(\hat{I}(u, t_{i'})\right)\right\|_2^2, \\ \quad\quad \text{otherwise} \end{cases}$$

in which relu( ) is the ReLU activation function and neighbor(u) is the set of all neighboring pixel locations from the pixel location u.

Figure 4:
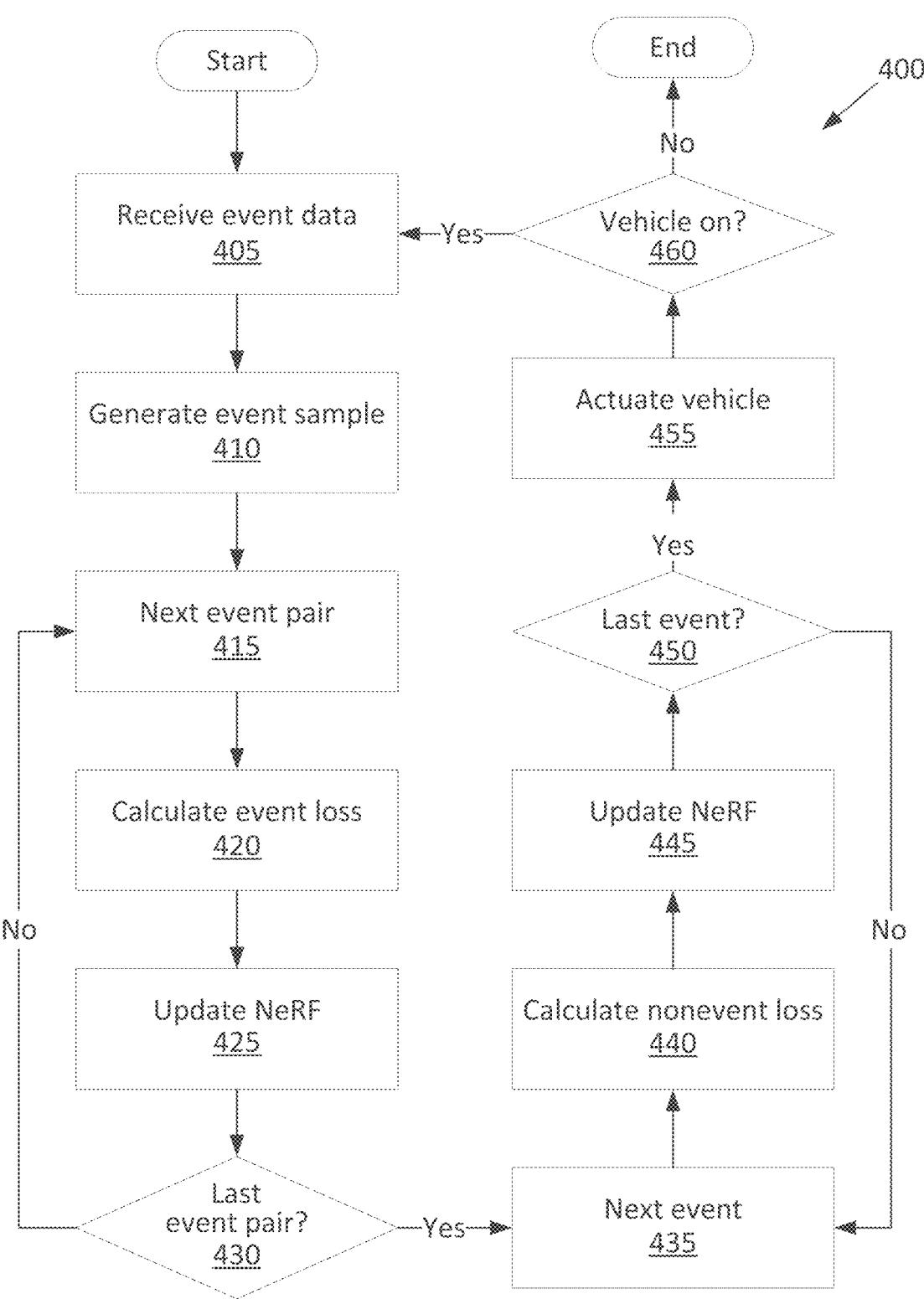
FIG. 4 is a flowchart of an example process for training the NeRF network.

FIG. 4 is a flowchart illustrating an example process 400 for training the NeRF network 300 and operating the vehicle 100 based on the NeRF network 300. The memory of the computer 105 stores executable instructions for performing the steps of the process 400 and/or programming can be implemented in structures such as mentioned above. As a general overview of the process 400, the computer 105 receives the data 200 from the event camera 110 and performs the sampling for the event loss and for the non-event loss. For each event pair in the sample for the event loss, the computer 105 calculates the event loss and updates the NeRF network 300. For each event in the sample for the nonevent loss, the computer 105 calculates the nonevent loss and updates the NeRF network 300. The computer 105 then actuates a component of the vehicle 100 based on the trained NeRF network 300. The process 400 repeats for as long as the vehicle 100 is on.

The process 400 begins in a block 405, in which the computer 105 receives the data 200 from the event camera 110, as described above.

Next, in a block 410, the computer 105 generates the samples for the event loss and for the nonevent loss, as described above.

Next, in a block 415, the computer 105 proceeds to a next event pair in the sample for the event loss. For example, the event pairs may be assigned index values, and the computer 105 may proceed to the next index value in ascending order, starting with the smallest.

Next, in a block 420, the computer 105 calculates the event loss for the current event pair, as described above.

Next, in a block 425, the computer 105 updates the NeRF network 300 based on the event loss, e.g., using backpropagation, as described above.

Next, in a decision block 430, the computer 105 determines whether the current event pair is the last event pair in the sample, e.g., the event pair with the highest index value. If not, the process 400 returns to the block 415 to continue with the next event pair. If so, the process 400 proceeds to a block 435.

In the block 435, the computer 105 proceeds to a next event and the corresponding time period in the sample for the nonevent loss. For example, the events may be assigned index values, and the computer 105 may proceed to the next index value in ascending order, starting with the smallest.

Next, in a block 440, the computer 105 calculates the nonevent loss for the period of time for the current event, as described above.

Next, in a block 445, the computer 105 updates the NeRF network 300 based on the nonevent loss, e.g., using backpropagation, as described above.

Next, in a decision block 450, the computer 105 determines whether the current event is the last event in the sample, e.g., the event with the highest index value. If not, the process 400 returns to the block 435 to continue with the next event. If so, the process 400 proceeds to a block 455.

In the block 455, i.e., after the training, the computer 105 actuates a component, e.g., a component of the vehicle 100, based on the NeRF network 300. For example, the computer 105 may actuate one or more of the propulsion system 120, brake system 125, steering system 130, or user interface 135. For example, the computer 105 may actuate the component in executing an advanced driver assistance system (ADAS). ADAS are electronic technologies that assist drivers in driving and parking functions. Examples of ADAS include forward proximity detection, lane-departure detection, blind-spot detection, braking actuation, adaptive cruise control, and lane-keeping assistance systems. The computer 105 may actuate the brake system 125 to stop the vehicle 100 before reaching an object in the environment as indicated by the NeRF network 300, according to an assistive braking algorithm. The computer 105 may actuate the user interface 135 to output a message to the operator notifying them of an object indicated by the NeRF network 300, according to a forward proximity detection algorithm. The computer 105 may operate the vehicle 100 autonomously, i.e., actuating the propulsion system 120, the brake system 125, and the steering system 130 based on the NeRF network 300. The computer 105 may execute a path-planning algorithm to navigate the vehicle 100 around objects in the environment using synthetic images 325 at possible future points on the planned path.

Next, in a decision block 460, the computer 105 determines whether the vehicle 100 is still on. In response to the vehicle 100 still being on, the process 400 returns to the block 405 to re-train the NeRF network 300, e.g., by updating the deformation network 310 in the next iteration for an additional time period. In response to the vehicle 100 turning off, the process 400 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and cither alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc.

have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   train a NeRF network to model a dynamic scene, the NeRF network being a neural radiance field modeling a geometry of the scene and a light intensity of the scene, the NeRF network including a baseline network modeling the scene at an initial time and a deformation network modeling change to the scene since the initial time;
   during the training, supervise the NeRF network with data from an event camera, the data from the event camera including a plurality of events, each event being a change in the light intensity; and
   update the NeRF network based on a loss function, the loss function including a nonevent loss based on a period between consecutive events at a pixel location;
   wherein, in response to the event occurring over the period at a neighboring pixel location, the nonevent loss includes a difference between a predicted change in the light intensity at the pixel location over the period according to the NeRF network and a contrast threshold.

2. The computer of claim 1, wherein the instructions further include instructions to, after the training, actuate a component of a vehicle based on the NeRF network, the vehicle including the computer and the event camera.

3. The computer of claim 1, wherein each event includes a pixel location and a time of the change in the light intensity.

4. The computer of claim 3, wherein each event indicates that the change in the light intensity at the respective pixel location and the respective time is greater than the contrast threshold.

5. The computer of claim 3, wherein each event includes a polarity indicating a direction of the respective change in the light intensity.

6. The computer of claim 1, wherein the loss function includes an event loss based on the events at a pixel location.

7. The computer of claim 6, wherein the event loss includes a difference between the predicted change in the light intensity at the pixel location according to the NeRF network and a summation of the events at the pixel location.

8. The computer of claim 1, wherein the nonevent loss includes a difference between the predicted change in the light intensity at the pixel location over the period according to the NeRF network and a preset value.

9. The computer of claim 1, wherein, in response to a lack of an event occurring over the period at the neighboring pixel location, the nonevent loss enforces the predicted change in the light intensity at the pixel location over the period according to the NeRF network to be zero.

10. The computer of claim 1, wherein the baseline network receives a position and a direction as inputs, and the baseline network outputs a light intensity and a volume density, the light intensity and the volume density as seen in the direction from the position.

11. The computer of claim 1, wherein the deformation network receives a current position and a current time as inputs, and the deformation network outputs a spatial change from the initial time to the current time of a point that is at the current position at the current time.

12. The computer of claim 11, wherein the baseline network receives the current position adjusted by the spatial change as an input.

13. The computer of claim 1, wherein the baseline network and the deformation network are multilayer perceptrons.

14. A method comprising:

training a NeRF network to model a dynamic scene, the NeRF network being a neural radiance field modeling a geometry of the scene and a light intensity of the scene, the NeRF network including a baseline network modeling the scene at an initial time and a deformation network modeling change to the scene since the initial time;

during the training, supervising the NeRF network with data from an event camera, the data from the event camera including a plurality of events, each event being a change in the light intensity; and updating the NeRF network based on a loss function, the loss function including a nonevent loss based on a period between consecutive events at a pixel location;

wherein, in response to the event occurring over the period at a neighboring pixel location, the nonevent loss includes a difference between a predicted change in the light intensity at the pixel location over the period according to the NeRF network and a contrast threshold.

15. The method of claim 14, further comprising, after the training, actuating a component of a vehicle based on the NeRF network, the vehicle including the event camera.

16. The method of claim 14, wherein the deformation network receives a current position and a current time as inputs, the deformation network outputs a spatial change from the initial time to the current time of a point that is at the current position at the current time, and the baseline network receives the current position adjusted by the spatial change as an input.

17. The computer of claim 1, wherein:

in response to the event occurring over the period at the neighboring pixel location, the nonevent loss includes a first function of the predicted change in the light intensity at the pixel location over the period according to the NeRF network; and in response to a lack of the event occurring over the period at the neighboring pixel location, the nonevent loss includes a second function of the predicted change in the light intensity at the pixel location over the period according to the NeRF network, the second function being different than the first function.

18. The method of claim 14, wherein:

in response to the event occurring over the period at the neighboring pixel location, the nonevent loss includes a first function of the predicted change in the light intensity at the pixel location over the period according to the NeRF network; and in response to a lack of the event occurring over the period at the neighboring pixel location, the nonevent loss includes a second function of the predicted change in the light intensity at the pixel location over the period according to the NeRF network, the second function being different than the first function.

* * * * *